W. HIBBS.
CORN HARVESTER.
APPLICATION FILED JULY 20, 1911.

1,090,150.

Patented Mar. 17, 1914.

6 SHEETS—SHEET 3.

Witnesses
Milton Lenoir
E. M. Klatche

Inventor
William Hibbs
By Gillson & Gillson
Attorneys

W. HIBBS.
CORN HARVESTER.
APPLICATION FILED JULY 20, 1911.
1,090,150.
Patented Mar. 17, 1914.
6 SHEETS—SHEET 4.
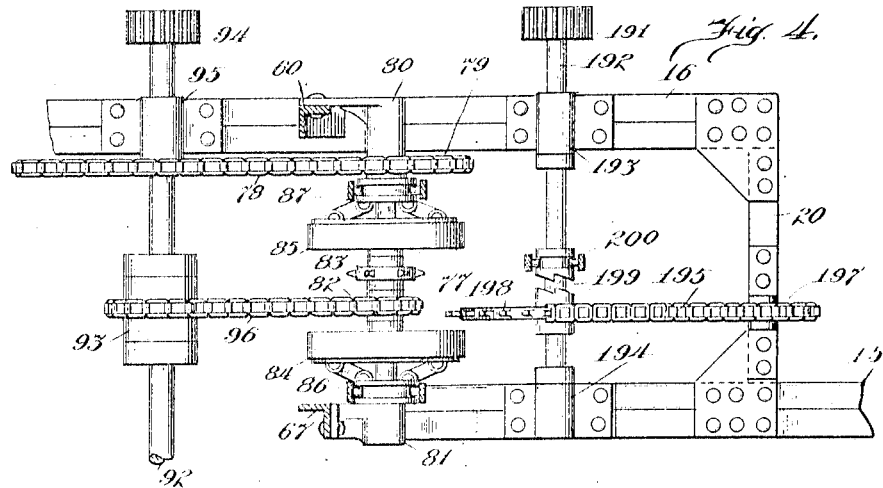
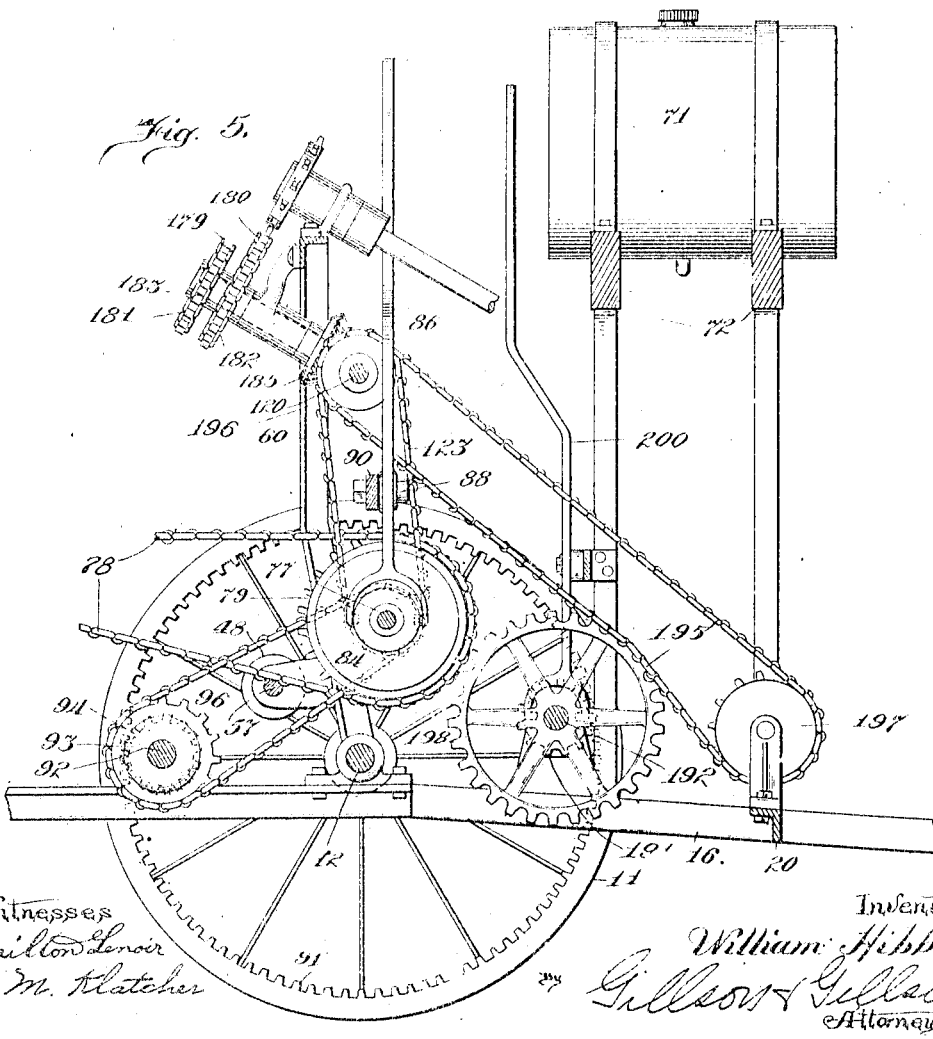
Witnesses
Milton Lenoir
E. M. Klatcher
Inventor
William Hibbs
Gillson & Gillson
Attorneys

W. HIBBS.
CORN HARVESTER.
APPLICATION FILED JULY 20, 1911.

1,090,150.

Patented Mar. 17, 1914.

6 SHEETS—SHEET 5.

Witnesses

Inventor
William Hibbs.
Gillson & Gillson
Attorneys

W. HIBBS.
CORN HARVESTER.
APPLICATION FILED JULY 20, 1911.
1,090,150.
Patented Mar. 17, 1914.
6 SHEETS—SHEET 6.
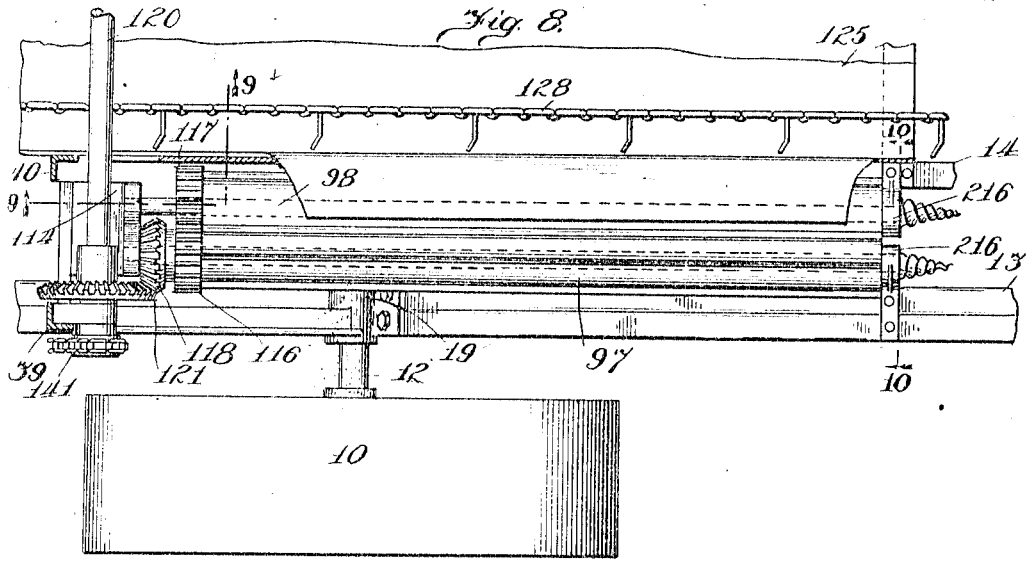
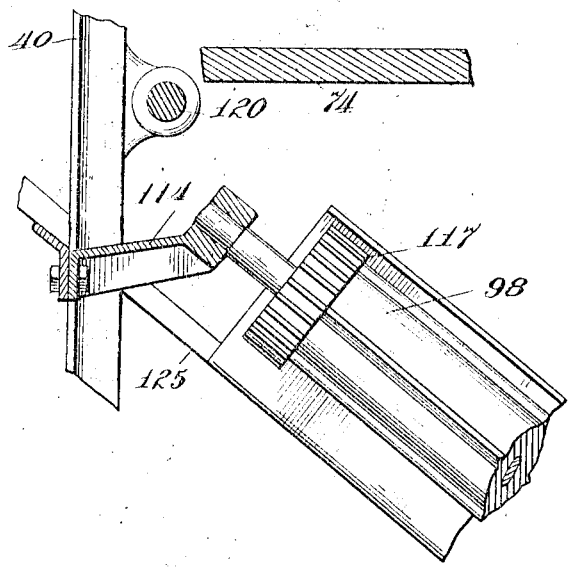
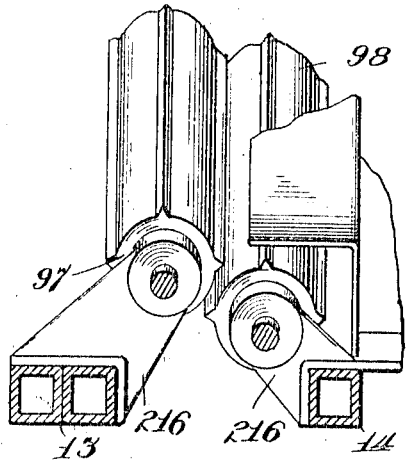
Witnesses
Milton Lenoir
E. M. Klatcher
Inventor
William Hibbs
By Gillson & Gillson
Attorneys.

UNITED STATES PATENT OFFICE.

WILLIAM HIBBS, OF PLANO, ILLINOIS.

CORN-HARVESTER.

1,090,150.

Specification of Letters Patent.

Patented Mar. 17, 1914.

Application filed July 29, 1911. Serial No. 639,563.

*To all whom it may concern:*

Be it known that I, WILLIAM HIBBS, a citizen of the United States, and resident of Plano, county of Kendall, and State of Illinois, have invented certain new and useful Improvements in Corn-Harvesters, of which the following is a specification, and which are illustrated in the accompanying drawings, forming a part thereof.

The invention relates to harvesters, and more particularly to machines for harvesting corn.

The object of the invention is to simplify and improve the construction of harvesting machines, and to provide a machine for harvesting corn which shall be effective and rapid in operation.

Figure 1:
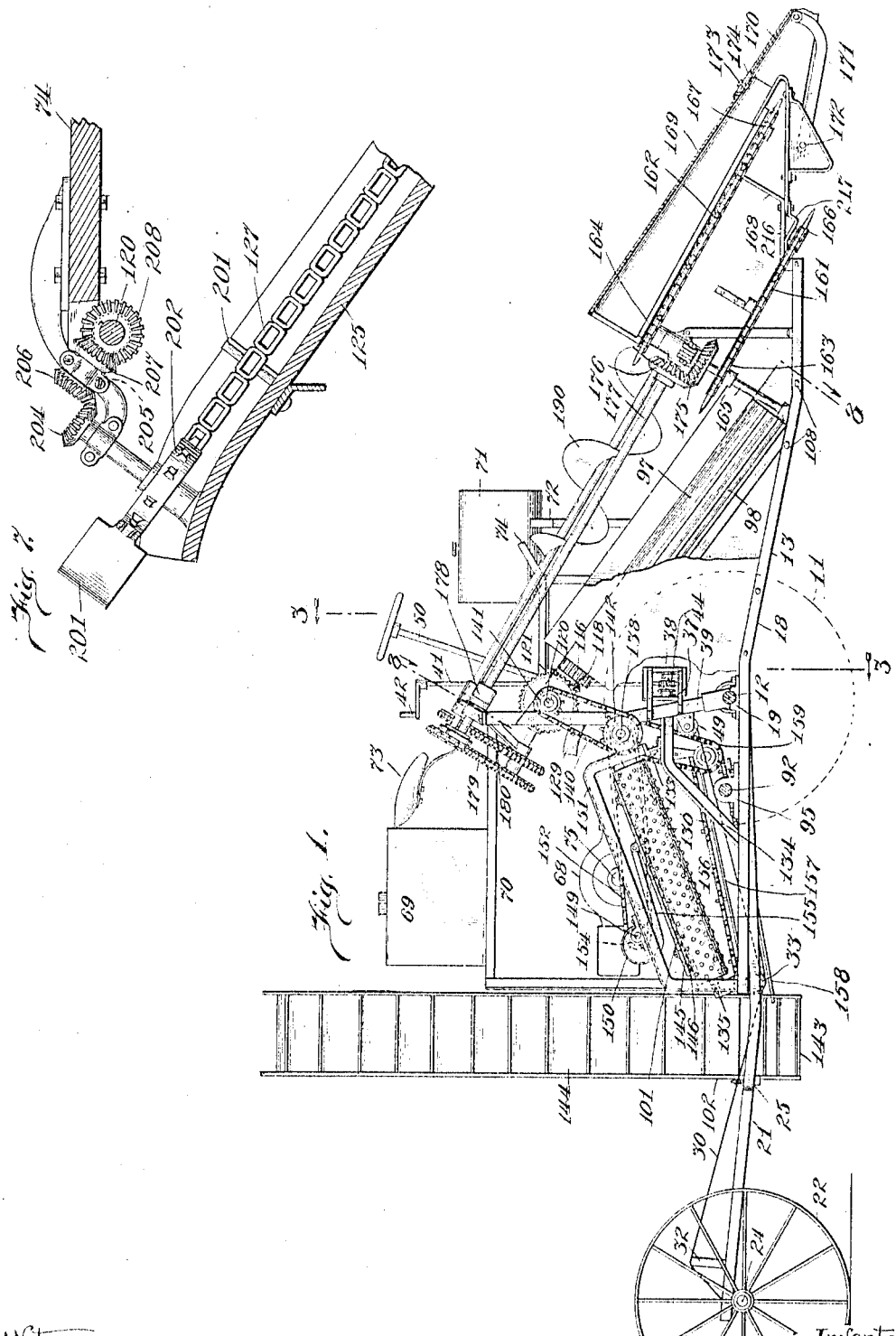
Figure 2:
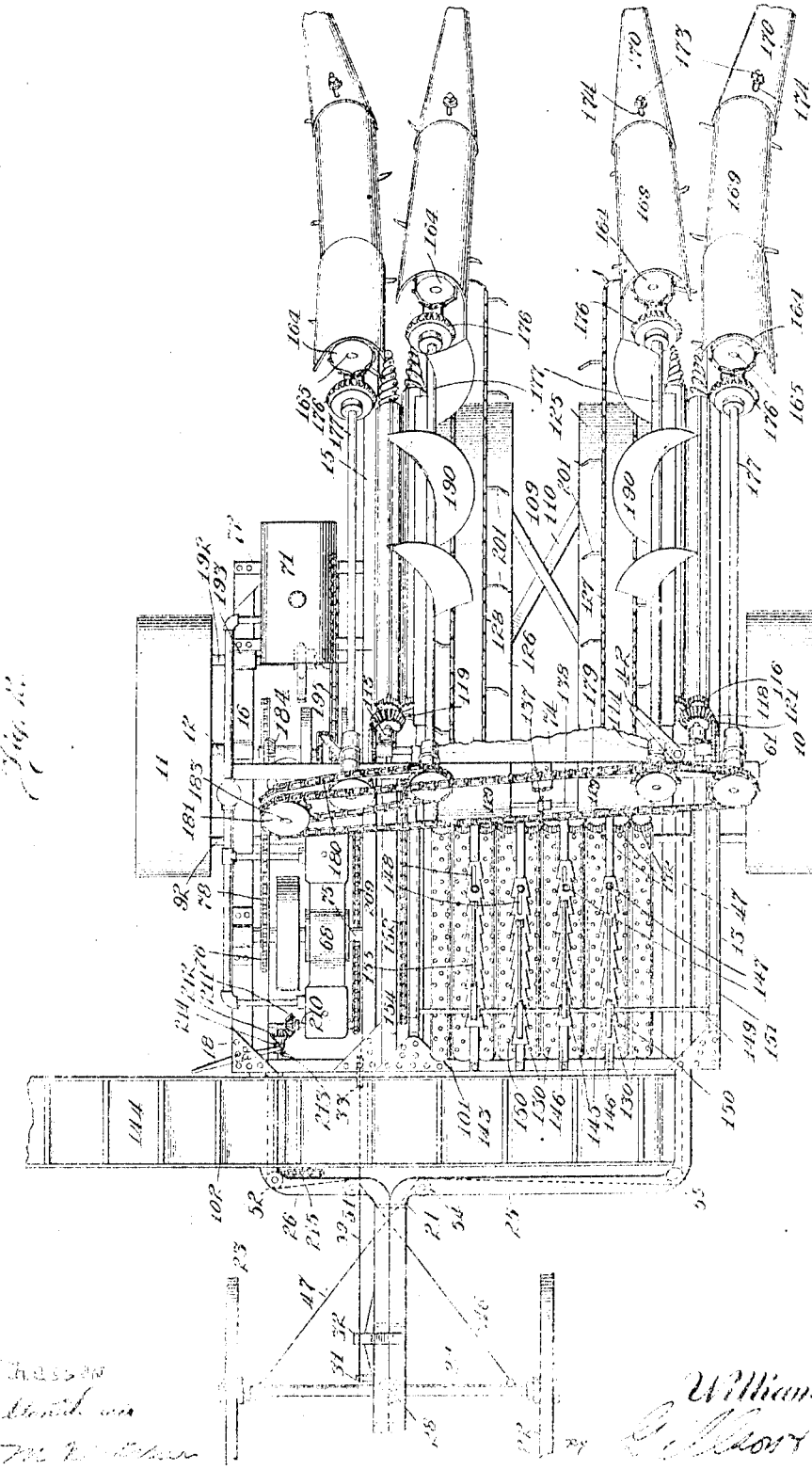
Figure 3:
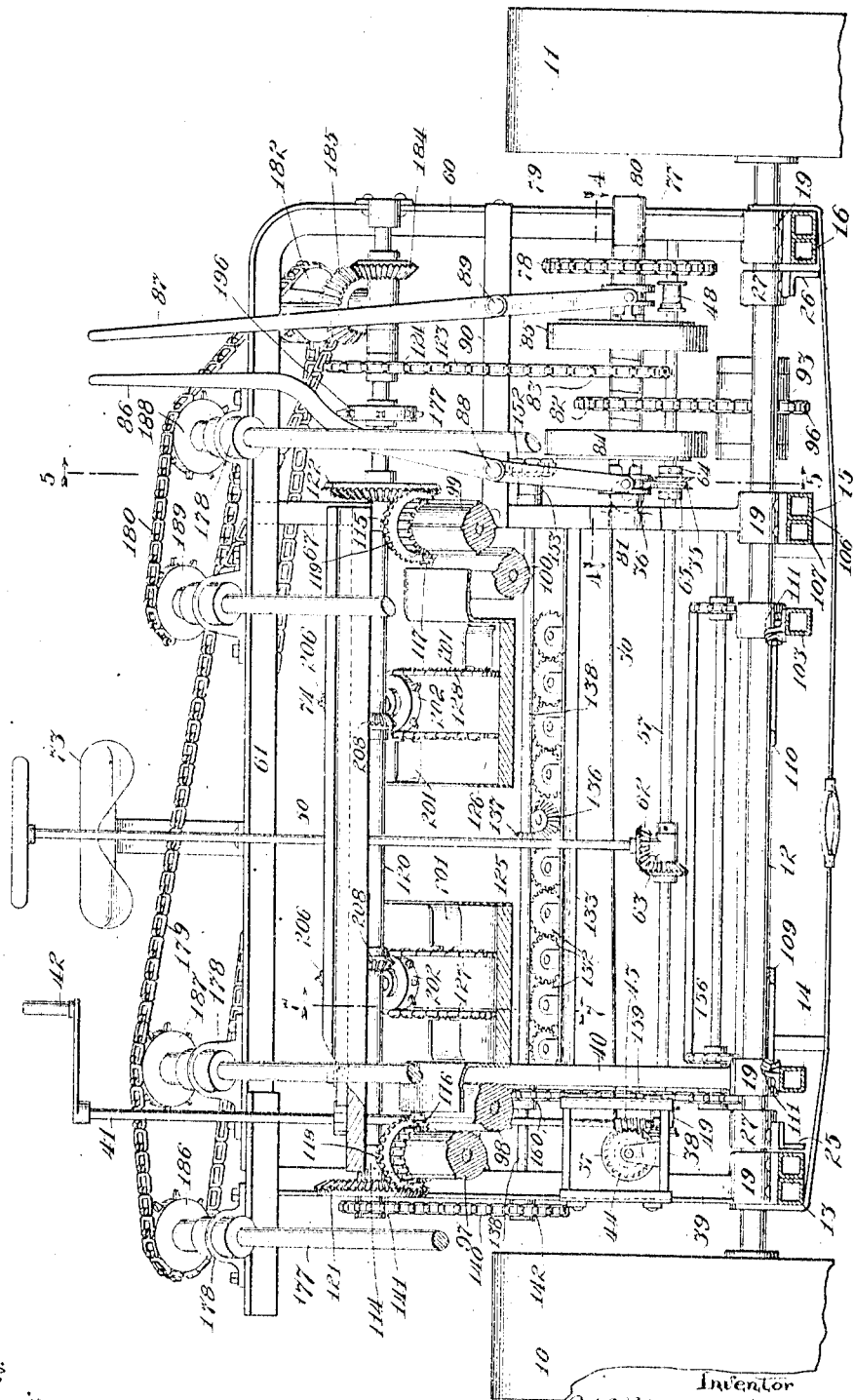
Figure 6:
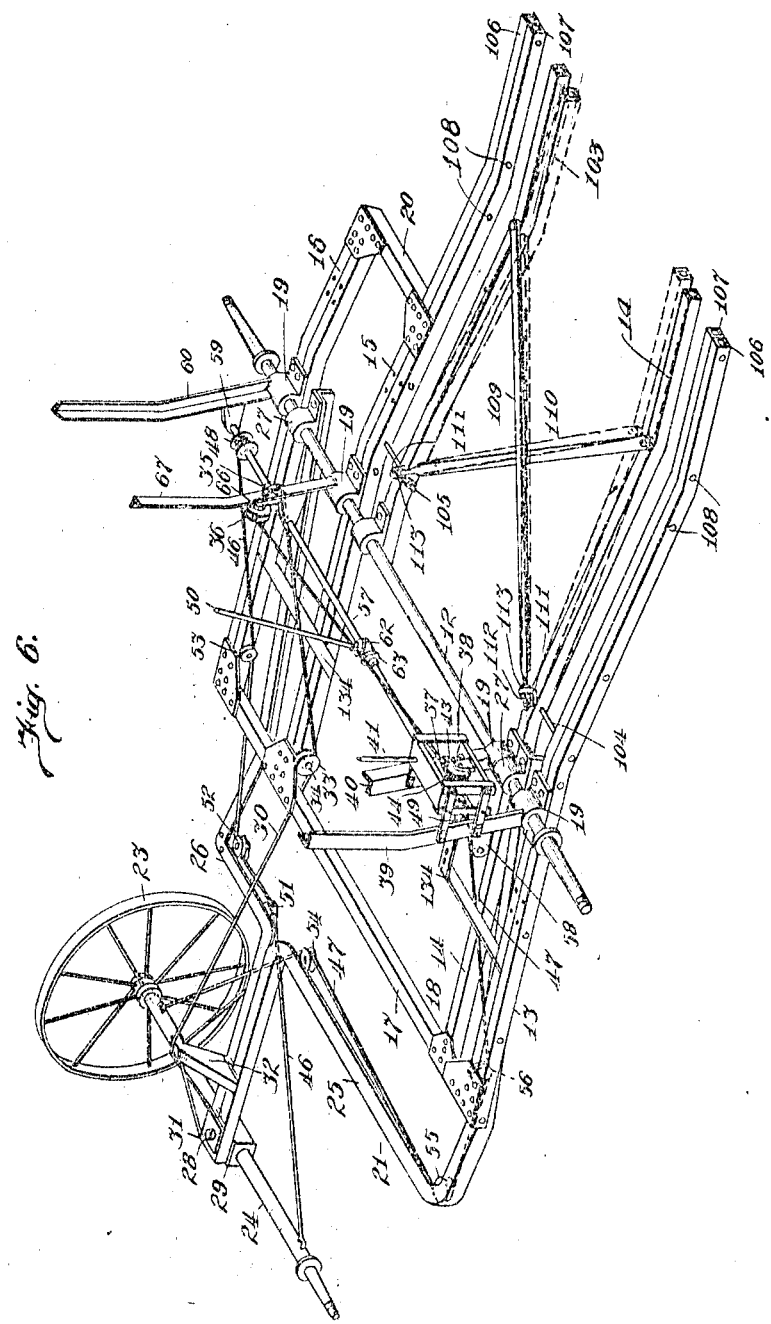

In the accompanying drawings, Figure 1 is a side elevation of a corn harvesting machine embodying the features of improvement provided by the invention, one of the supporting and traction wheels being removed and some of the parts being broken away; Fig. 2 is a plan view of the same; Fig. 3 is a vertical transverse sectional view taken on the line 3—3 of Fig. 1; Figs. 4 and 5 are detail sectional views taken on the lines 4—4 and 5—5, respectively, of Fig. 3; Fig. 6 is a perspective view illustrating the carrying frame of the machine; Fig. 7 is a detail sectional view taken on the line 7—7 of Fig. 3. Fig. 8 is a detail sectional view taken on the line 8—8 of Fig. 1; and Figs. 9 and 10 are sectional views taken on the lines 9—9 and 10—10 respectively of Fig. 8.

The machine illustrated in the accompanying drawings is of that class of harvesters which are known as corn pickers and huskers, and which gather ears of corn by breaking them from the standing stalks and then husk them and deliver them to a wagon or other container which accompanies the harvester through the field. As shown, the machine is adapted to simultaneously harvest two rows of corn and is arranged to be propelled and operated by power derived from a motor incorporated with and carried by the machine.

The machine is principally supported by two traction wheels designated 10 and 11. These traction wheels are loosely mounted upon the opposite ends of an axle 12, which extends centrally through the main frame of the machine. This main frame of the machine comprises a plurality of longitudinal sills 13, 14, 15 and 16, and a rear end sill 17.

The rear end sill 17 rigidly connects all of the longitudinal sills 13, 14, 15 and 16, and forms therewith a tilting frame generally designated 18. The frame 18 is pivotally hung upon the axle 12, as by means of a plurality of bearing blocks 19 which are secured to the several longitudinal sills 13, 14, 15 and 16, and which receive the axle 12. The longitudinal sill 16 preferably extends only a short distance in front of the axle 12, and has its forward end connected to the adjacent longitudinal sill 15 by a front end sill 20.

A supplemental frame, generally designated 21, and rear carrying wheels 22 and 23, are provided to assist in guiding the machine through the field and for maintaining the main frame 18 in angularly adjusted position. The carrying wheels 22 and 23 are mounted upon the opposite ends of a rear steering axle 24. The supplemental frame 21 is conveniently formed from a pair of bars 25 and 26, arranged close together for a portion of their length adjacent the rear end of the frame and spaced apart to substantially the width of the main frame 18 adjacent their forward ends. The bars 25 and 26 of the frame 21 preferably underlie the rear end portion of the frame 18, and they are connected to the axle 12 at their forward ends, as by means of bearing blocks 27, one of which is applied to the forward end of each of the bars 25, 26, and receives the axle 12. The rear axle 24 is pivotally connected to the rear end of the frame 21, as by a king bolt 28 passed through the axle 24 and through a block 29 which connects the bars 25 and 26 at their rear ends.

A flexible cable 30, which is secured to the rear end of the frame 21 at 31 and extends over a strut 32, serves for tilting the frame 18. The strut 32 rises from the rear end portions of the bars 25, 26. A sheave 33 is applied to the frame 18, as by being mounted upon a pin 34 which projects laterally from the longitudinal sill 15 adjacent its rear end. The forward end of the cable 30 preferably extends about guide pulleys 35 and 36, and is wound upon a drum 37 located adjacent one side of the machine. As shown, the drum 37 is journaled in a box-like frame 38, mounted upon standards 39 and 40, which rise from the sills 13 and 14, respectively. For turning the drum 37 a rotatable post 41, having a crank 42 applied to its higher end, is preferably employed. As shown the post 41 is journaled in the upper and lower walls of the box-like frame 38. It is operatively connected to the drum 37 by means of a worm 43, mounted on the post 41 adjacent its lower end. This worm meshes with a worm wheel 44 formed upon one end of the drum 37.

The machine is guided by swinging the rear axle 24 upon the king bolt 28. For this purpose a steering post 50 is preferably provided. As shown, flexible cables 46 and 47 are attached to the axle 24 adjacent its ends, and are oppositely wound upon drums 48 and 49, which are turned by the steering post. The cable 46 extends over guide pulleys 51, 52, mounted in the frame 21, and over a guide pulley 53 mounted in the frame 18. The cable 47 extends over guide pulleys 54 and 55, mounted in the frame 21, and over a guide pulley 56 mounted in the frame 18. The two drums 48 and 49 are preferably located adjacent opposite sides of the frame of the machine. As shown, they are fixed upon a shaft 57 which extends across the machine above the axle 12. This shaft is journaled at one end in a bracket 58, formed upon the standard 39, and at the other end in a bracket 59 formed upon a similar standard 60, which rises from the longitudinal sill 16.

A cross rail 61, which extends between the standards 39 and 60 and connects their higher ends, serves to support a seat 73 in a convenient position with reference to the steering post 50. A platform 74, carried by the standard 40 and by a similar standard 67 which rises from the longitudinal sill 15, provides a journal bearing and support for the steering post 50 and a foot-rest for the operator occupying the seat 73. The steering post is operatively connected with the shaft 57 by means of beveled gears 62 and 63 mounted on the steering post and shaft, respectively. The shaft 57 provides a convenient support for the guide pulley 35, which, as shown, turns loosely thereon between collars 64 and 65 (Fig. 3). The guide pulley 36 is preferably mounted on a bracket 66, shown as being applied to the standard 67.

A gasolene motor, generally designated by the numeral 68, is preferably employed for propelling and operating the machine. As shown, this motor is mounted on the longitudinal sills 15 and 16 in rear of the axle 12, whereby its weight serves to counterbalance that of parts to be hereinafter described which are mounted in the frame 18 in front of the axle. Cooling water for the motor 68 is supplied from a tank 69. This tank is shown as being supported over the motor by a frame 70, which rises from the longitudinal sills 15, 16, and from the rear end sill 17. A gasolene tank for supplying the motor with fuel is shown at 71. This tank is conveniently supported upon a frame 72, which rises from the longitudinal sills 15, 16, in front of the axle 12.

The power shaft of the gasolene motor 68 is shown at 75. This power shaft is preferably equipped with a sprocket wheel 76 (Fig. 2). Power is transmitted from the sprocket wheel 76 to a countershaft 77. As shown, a sprocket chain 78 (Figs. 2 and 4) turns over the sprocket wheel 76, and over a sprocket wheel 79 mounted on the countershaft, whereby the countershaft 77 is continuously rotated whenever the motor 68 is in operation. The countershaft 77 extends between the standards 60 and 67, and is journaled in bearing blocks 80 and 81 mounted on said standards, respectively.

Two sprocket wheels 82 and 83 are mounted on the countershaft 77, and are adapted to be rotated therewith through clutches designated 84 and 85, respectively. One of the sprocket wheels, as 82, serves to transmit power to the traction wheels 10 and 11 to drive the machine in a forward direction. The other sprocket wheel, as 83, serves to transmit power to the operative parts of the machine and to the traction wheel 11, when it is desired to impart rearward movement to the machine. Hand levers 86 and 87, are provided for controlling the clutches 84 and 85, respectively. These hand levers are pivotally mounted at 88 and 89, respectively, upon a cross-bar 90 which extends between the standards 60 and 67 above the countershaft 77. The travel of the machine in a forward direction is controlled by the use of the hand lever 86. The operation of the machine is controlled by the use of the hand lever 87.

An annular gear 91 is mounted upon each of the traction wheels 10 and 11. A sectional shaft 92, having its parts connected by a differential gear case 93 (Fig. 4), extends across the frame of the machine and has a pinion, as 94, applied to each of its ends for engaging the gear 91 formed upon the traction wheel 10, 11, located at the corresponding side of the machine. As shown, the shaft 92 is journaled in bearing blocks, as 95 (Fig. 1), mounted on the several longitudinal sills 13, 14, 15 and 16. A sprocket chain 96 turns over the sprocket wheel 82 on the countershaft 77 and over the differential gear case 93 for turning the shaft 92 and traction wheels 10 and 11 when the clutch 84 is closed.

The operative parts of the machine preferably comprise two sets of snapping rolls, as 97, 98, and 99, 100, for breaking the ears of corn from the standing stalks, a husking table 101, and an elevator 102 for delivering the husked ears of corn to a wagon or other container (not shown) which accompanies the machine through the field. The several longitudinal sills 13, 14 and 15 are extended in front of the axle 12 for supporting the snapping rolls 97, 98 and 99, respectively, at their forward ends. For supporting the front end of the snapping roll 100, a bar 103 extends forwardly from the axle 12 parallel with and adjacent the longitudinal sill 15. The longitudinal sills 13, 14, and the bar 103 and longitudinal sill 15 are preferably rigidly connected adjacent the axle 12 as by tie-rods 104 and 105, but the spaces between the sills 13, 14, and between the bar 103 and sill 15, are most desirably left clear in front of the tie-rods 104 and 105 in order that the said members may pass upon opposite sides of adjacent rows of corn as the machine travels through the field.

Preferably the longitudinal sills 13 and 15 are made rigid, as by being formed from a double thickness of tubular beams, as 106 and 107, connected at intervals by rivets, as 108, whereas the longitudinal sill 14 and the bar 103 are yielding. The spacing of the sills 13 and 14, and the bar 103 and sill 15, is adjusted in width adjacent the forward ends of these members, preferably by flexing the sill 14 and bar 103. For this purpose a pair of adjustable brace rods 109 and 110 are conveniently employed. As shown, each of the brace rods 109 and 110 is connected to one of the members 14 and 103 adjacent its forward end and extends diagonally backward therefrom to the rear end portion of the other member, where it is adjustably attached, as by being passed through an eye 111 mounted upon such member, and by having threaded nuts, as 112 and 113, applied to the corresponding brace rod upon opposite sides of such eye.

The snapping rolls 97, 98, and 99, 100, are supported in an inclined position, their forward ends being the lower. As shown, the forward end of each of the snapping rolls is journaled in a bearing block 216, one of which is mounted upon each of the sills 13, 14, 15, and on the bar 103. The bearing blocks mounted on the sills 13 and 14 are shown in detail in Fig. 10 of the drawings, and those mounted upon the sill 15 and on the bar 103 are of like construction. The higher ends of the snapping rolls are journaled in brackets 114 and 115, one of said brackets, as 114, being carried by the standards 39 and 40, and the other of said brackets, as 115, being carried by the standard 67. In this manner the spacing of the forward ends of the two sets of snapping rolls 97, 98, and 99, 100, is adjusted by flexing the sill 14 and bar 103.

The snapping rolls of each pair, as 97, 98, and 99, 100, are geared together at their higher ends, as indicated at 116 and 117. For turning the rolls power is applied to the higher end of one of the rolls of each pair. As shown, the rolls 97 and 99 are each equipped with a beveled gear, as 118 and 119. A shaft 120, which extends across the frame of the machine and is journaled adjacent its opposite ends in the standards 39 and 60, carries beveled gears 121 and 122 which mesh with the beveled gears 118 and 119, respectively. The shaft 120 is turned by a sprocket chain 123, which passes over the sprocket wheel 83 on the countershaft 77 and over the sprocket wheel 124 on the shaft 120.

The ears of corn stripped from the standing stalks by the snapping rolls 97, 98, and 99, 100, fall upon platforms 125 and 126, one of which extends alongside of each pair of the snapping rolls. The platforms 125 and 126 are inclined, and an elevator, as 127 and 128, moves over each for delivering the ears of corn received thereon from the higher ends, as 129, of the platforms, from which they fall by gravity onto the husking table 101. The elevators 127 and 128 preferably take the form of sprocket chains having flights 201 secured thereto at intervals. Each of the sprocket chains turns over a sprocket 202 at its higher end. As shown, a beveled gear 204 is formed on each of the sprocket wheels 202, and a pair of short shafts 205, each having beveled gears, as 206 and 207, mounted thereon for engaging with one of the gears 204 and with one of a pair of gears 208 mounted on the shaft 120, respectively, are provided for driving the elevators 127 and 128.

The husking table 101 comprises a plurality of rollers 130, arranged in parallel relation in an inclined position and all geared together adjacent one end by intermeshing spur gears 132. The higher ends of the rollers 130 are journaled upon a cross-rail 133, which is supported at its opposite ends upon brackets, as 134, one of which is secured to each of the uprights 39 and 67 and to the adjacent longitudinal sill, as 13 and 15 (Fig. 6). The lower ends of the husking rollers 130 are journaled in bearing blocks, as 135, carried by the rear end sill 17 of the frame 18.

For driving the husking rollers 130, one of them is equipped with a beveled gear 136, which meshes with a gear 137 mounted on a transverse shaft 138. The shaft 138 is turned by a sprocket chain 140 (Fig. 1), which passes over a sprocket wheel 141 mounted on the shaft 120, and over a sprocket wheel 142 mounted on the shaft 138. From the lower end of the husking table 101 the ears of corn fall upon a traveling belt conveyer 143, which, as shown, extends across the frame 21 in rear of the frame 18. A second belt conveyer 144 extends upwardly from a point adjacent the discharge end of the conveyer 143 and constitutes an elevator for discharging the ears of corn at a suitable elevation at the side of the machine. The conveyers 143 and 144 may be driven from any conveniently accessible movable part of the machine, as the shaft 92. As shown, a sprocket chain 209 (Fig. 2) operatively connects a shaft 210 with the shaft 92. The shaft 210 carries a beveled gear 211, which meshes with a second beveled gear 212. The gear 212 is loosely mounted on a shaft 213 extending forwardly from the conveyer 143, and is operatively connected to said shaft by a clutch 214. The conveyer 143 and elevator 144 are operatively connected by a sprocket chain 215, whereby the elevator 144 is driven from the conveyer 143. At times when a wagon or other container cannot be conveniently maintained beneath the discharge end of the elevator 144 for receiving the ears of corn, as when the machine is being turned about in the field or when one wagon has been filled and it is necessary to have another wagon take its place at the side of the machine, the operation of the conveyer 143 and elevator 144 is preferably temporarily interrupted by the use of the clutch 214. At such times the ears of corn delivered from the husking table 101 are permitted to accumulate on the conveyer 143.

Provision is preferably made for agitating the ears of corn as they rest upon the husking table 101 for insuring their assuming a proper position on said table for being stripped of their husks and for being gradually moved over the table to the belt conveyer 143. As shown, a plurality of toothed bars 145 extend over the table 101 to cover the alternate spaces between adjacent rolls 130. Each of these bars is slidingly mounted upon a strap, as 146, which straps arch over the table 101. As shown, a bolt 147, projecting from each of the straps 146, passes through a slot 148 in the corresponding bar 145. The opposite ends of the straps 146 are secured to the rear end sill 17 and to the cross rail 133, respectively.

The bars 145 are longitudinally reciprocated during the operation of the machine. For effecting the reciprocation of these bars a shaft 149, having a plurality of eccentrics 150 mounted thereon, extends transversely over the husking table 101. For supporting the shaft 149 an arched frame member 151 extends between the cross rail 133 and the rear end sill 17 at each side of the husking table 101. The shaft 149 is journaled adjacent its opposite ends in the frame members 151. It is driven by a sprocket chain 152, which turns over a sprocket wheel 153 on the shaft 138, and over a sprocket wheel 154 on the shaft 149. An eccentric rod 155 operatively connects each of the eccentrics 150 with one of the bars 145. Preferably the adjacent eccentrics 150 are oppositely set upon the shaft 149, whereby adjacent bars 145 are reciprocated in alternation. By means of this arrangement ears of corn which fall upon the husking table 101 in such a way that they rest transversely upon the rolls 130 will be engaged at opposite ends by adjacent bars 145. As adjacent bars 145 move in opposite directions the ears of corn will be turned thereby to rest longitudinally upon the rolls, in which position they will be stripped of their husks and will be moved toward the belt conveyer 143.

A traveling slatted apron 156, having its upper turn movable over a grating 157 and its lower turn movable over a closed table 158, serves for carrying the husks forwardly beneath the husking table 101, and for delivering any shelled corn which may pass through the husking table 101 and grating 157 to the conveyer 143. The apron 156 is driven by a sprocket chain 159, which turns over a sprocket wheel 160 mounted on the shaft 138.

A pair of superimposed gathering chains, as 161 and 162, are preferably located in front of each of the snapping rolls 97, 98, and 99, 100. The gathering chains of each pair are of unequal length, the upper chain 162 being the longer. Both chains of each pair turn over sprockets, as 163 and 164, at their inner ends, said sprockets being mounted upon an upright shaft 165. At their forward ends the gathering chains 161 and 162 turn over sprockets designated 166 and 167, respectively. The upright shaft 165 and the sprockets 166 and 167 pertaining to each pair of gearing chains 161 and 162, are journaled in and carried by a rigid frame generally designated 168, which frame is mounted upon the forward end of the corresponding sill 13, 14, 15 or bar 103.

Preferably each of the frames 168 comprises a lower horizontal rail 216, which projects forwardly from the corresponding sill 13, 14, 15 or bar 103 (Fig. 1). Most desirably each sprocket wheel 166 is mounted upon the underside of the corresponding rail 216, as by means of a bracket 217, to bring each of the gathering chains 161 close to the ground at its forward end for raising and gathering stalks of corn which may have been beaten down.

Each set of gathering chains is partially covered by a sheet metal hood 169, each of such hoods being carried by the corresponding frame 168 and being provided with a flexible point or shoe designated 170. The flexible point of each hood is secured adjacent its outer end to the forward end of an oscillatable runner 171. Each of these runners is pivotally attached at its inner end to the corresponding frame 168, as at 172 (Fig. 1). The inner end of each of the shoes 170 fits over and slides upon the corresponding hood 169, a connection between the shoe and hood permitting of a limited sliding movement of the former being provided by a bolt 173, which passes through the hood 169 and through a slotted opening 174 in the shoe. The runners 171 slide upon the ground when the forward end of the frame 18 is depressed, thereby raising the shoes with respect to the several hoods 169 and preventing the points of the shoes from entering the ground.

For driving the gathering chains 161, 162, of each pair a beveled gear 175 is mounted upon the corresponding shaft 165. Each of these beveled gears meshes with a beveled gear 176, mounted upon the forward end of a shaft 177, which extends over the corresponding snapping roll, as 97, 98, and 99, 100. The forward end of each of the shafts 177 is journaled in the corresponding frame 168. The rear end of each of the shafts 177 is journaled upon and supported by the cross-rail 61, as in bearing blocks 178 carried thereby (Fig. 3). The shafts 177 pertaining to each pair of snapping rolls 97, 98, and 99, 100, are shown as being driven by a single sprocket chain, as 179 and 180. The sprocket chains 179 and 180 are each driven by turning over a sprocket wheel, as 181 and 182, both of which are mounted upon a stub shaft 183, which is driven by beveled gears 184 and 185 from the shaft 120. Each of the sprocket chains 179 and 180 also turns over two sprocket wheels, as 186, 187, 188 and 189, one of which is mounted upon each of the shafts 177. Preferably one of the shafts 177 pertaining to each pair of snapping rolls 97, 98, and 99, 100, is equipped with spirally formed flights, as 190, for engaging and depressing the stalks of corn.

When it is desired to propel the machine backwardly, power for this purpose is applied to one of the carrying wheels, as 11, through a pinion 191, which meshes with the annular gear 91. As shown, the pinion 191 is mounted upon the end of a shaft 192, which is journaled in bearing blocks 193 and 194, mounted on the sills 16 and 15, respectively. For driving the shaft 192 a sprocket chain 195 turns over a sprocket wheel 196 mounted on the shaft 120, and over an idle wheel 197, and engages a sprocket wheel 198 which turns loosely on the shaft 192. The idle wheel 197 is mounted on the front end sill 20. A clutch 199, controlled by a hand lever 200, is provided for operatively connecting the sprocket wheel 198 to the shaft 192.

I claim as my invention—

1. In a corn harvester, in combination, two pairs of snapping rolls arranged in parallel relation, separate supporting members for each of the rolls fixed at one end only, the supports for the two outer rolls being rigid and the supports for the two inner rolls being flexible, and an adjustable brace rod connecting the supports for the two inner rolls.

2. In a corn harvester, in combination, two pairs of snapping rolls arranged in parallel relation, separate supporting members for each of the rolls fixed at one end only, the supports for the two outer rolls being rigid and the supports for the two inner rolls being flexible, and an adjustable brace rod connecting the unfixed end of each of the supports for the two inner rolls with the fixed end of the other of said supports.

3. In a corn harvester, in combination, a pair of parallel supports fixed at one end only, one thereof being rigid and the other flexible, a pair of coöperating snapping rolls, one carried by each of said supports, each of said rolls being journaled at one end upon the fixed end of the corresponding support and at the other end upon the unfixed end of said support, and an adjustable brace connected to the unfixed end of the flexible support.

4. In a corn harvester, in combination, a tilting carriage frame, a pair of inclined snapping rolls mounted in said frame in front of its pivot, a gathering chain in front of each of the rolls, a deflecting hood covering each of the said gathering chains and having a vertically movable point, and a runner extending beneath each of said hoods, the rear end of each of the runners being pivotally attached to the said carriage frame to swing in a vertical plane and the forward end of each of the runners being connected to the movable point of the corresponding deflecting hood.

5. In a corn harvester, in combination, a tilting frame, a pair of coöperating inclined snapping rolls longitudinally mounted in the frame in front of its pivot, a horizontal gathering chain in front of each of the snapping rolls, a sectional hood for each gathering chain, the front section of each of said hoods being vertically oscillatable, a runner extending beneath each of the said hoods, the rear end of the runner being pivotally attached to the frame to swing in a vertical plane and the forward end of the runner being connected to the front section of the corresponding hood.

WILLIAM HIBBS.

Witnesses:
CHARLES B. GILLSON,
N. BECKSTROM.